US00RE36913E

United States Patent [19]

Ferraro

[11] E Patent Number: Re. 36,913

[45] Reissued Date of Patent: Oct. 17, 2000

[54] SWIMMING POOL VACUUM SYSTEM

[76] Inventor: Michael J. Ferraro, 14812 N. 49th St., Scottsdale, Ariz. 85254

[21] Appl. No.: 09/185,731

[22] Filed: Nov. 3, 1998

Related U.S. Patent Documents

Reissue of:

[64] Patent No.: 5,605,622
Issued: Feb. 25, 1997
Appl. No.: 08/503,885
Filed: Jul. 18, 1995

[51] Int. Cl.[7] ..... E04H 4/16; B01D 29/50

[52] U.S. Cl. ..... 210/169; 210/340; 210/416.2; 210/420; 210/424; 4/509

[58] Field of Search ..... 210/169, 340, 210/416.2, 420, 424, 242.1; 4/490, 507, 509

[56] References Cited

U.S. PATENT DOCUMENTS

| | | | |
|---|---|---|---|
| 3,080,060 | 3/1963 | Blumenkranz et al. | 210/424 |
| 3,508,661 | 4/1970 | Diemond et al. | 210/169 |
| 3,701,427 | 10/1972 | Howard | 210/169 |
| 3,856,679 | 12/1974 | Jackson . | |
| 4,348,281 | 9/1982 | Perry et al. . | |
| 4,454,035 | 6/1984 | Stefan . | |
| 4,627,118 | 12/1986 | Baker | 4/509 |
| 4,740,307 | 4/1988 | Beulteman | 210/169 |
| 4,743,368 | 5/1988 | Gates | 210/169 |
| 4,818,389 | 4/1989 | Tobias et al. | 210/169 |
| 4,902,412 | 2/1990 | Surber, III et al. | 210/169 |
| 5,173,181 | 12/1992 | McFarland . | |
| 5,269,913 | 12/1993 | Atkins . | |
| 5,329,648 | 7/1994 | Davey | 4/490 |
| 5,352,358 | 10/1994 | Davey . | |

*Primary Examiner*—Christopher Upton
*Attorney, Agent, or Firm*—Parsons & Goltry; Robert A. Parsons; Michael W. Goltry

[57] ABSTRACT

A vacuum system for use in a swimming pool installation including a swimming pool and a recirculating system. The recirculating system includes a skimmer device and a main drain coupled to a pump and a filter assembly for recirculating the water in the swimming pool. The vacuum system includes a vacuum module mounted adjacent the swimming pool, a conduit coupling the vacuum module to the pump, and a hose coupling extending from the vacuum module in liquid communication with the swimming pool, the hose coupling adapted to receive a vacuum hose.

25 Claims, 3 Drawing Sheets

3
37
32
39
35
36
13
28
25
24
23
34
10
22
18
30
32
17
15
27
20
19
14
33
12

SWIMMING POOL VACUUM SYSTEM

Matter enclosed in heavy brackets [ ] appears in the original patent but forms no part of this reissue specification; matter printed in italics indicates the additions made by reissue.

BACKGROUND OF THE INVENTION

1. Field or the Invention

This invention relates to swimming pools.

More particularly, the present invention relates to apparatus useful in keeping a swimming pool clean.

In a further and more specific aspect, the instant invention concerns a dedicated pool vacuum system.

2. Prior Art

A conventional swimming pool installation usually incorporates a recirculating system having a pump and a filter assembly located adjacent the pool for circulating and filtering the pool water. Typically included in this recirculating system is a skimming device adjacent the sidewall of the pool and a main drain located on the floor of the pool. Water from the pool is drawn through the skimming device and the main drain by the pump, and forced through the filter assembly before being returning to the pool through a discharge outlet. The skimmer device removes the film of material and floating objects from the surface of the water while the main drain is adapted to collect sediment which sinks to the bottom of the pool. A small filter basket is usually provided in the system before the pump to intercept large debris picked up by the main drain or which has passed through the skimmer device.

Often, before the skimming device can remove all of the dirt and debris from the surface of the pool, the material will sink. The dirt and debris which sinks to the bottom of the pool collects on the floor and may not be pulled through the main drain. To remove this material, it must be swept toward the main drain, or vacuumed up as is commonly done. A vacuum generally consists of a hose having a first end coupled to a vacuum head and a second end coupled to the pump to provide suction. The second end is generally coupled to the pump via the skimmer device. Many skimmer devices are adapted to receive the second end of the hose directly, or by using an adapter. The material is sucked through the hose with the pool water, and forced through the filter assembly which removes the material.

Many pool owners find the necessity of vacuuming the pool a tedious task, best avoided at all costs. To this end, they hire services which maintain the pool, or have installed special devices which will automatically clean the pool. These devices include special jets which form water currents pushing dirt and debris toward the main drain, and automatic vacuum devices. The automatic vacuum devices are similar to conventional vacuums, in that they include a vacuum head and a hose. The difference is that they continuously move about the pool floor by themselves, continually picking up dirt and debris. This greatly reduces the labor involved in keeping a pool clean. Automatic vacuums, however, present new problems.

In a properly maintained pool, the skimmer device will keep the surface of the pool clean, and remove large debris before it sinks. The skimmer devices generally include a strainer basket which collects the larger debris and prevents it from passing on to the filter assembly. The strainer basket can be easily emptied of the collected debris. In this manner, very little debris will pass through the system to the small strainer basket. This is desirable because as debris collects in the basket, the performance of the recirculating system is reduced. In a properly maintained system, the smaller basket needs to be cleaned infrequently. This is accomplished by turning the pump off, opening a scaled lid and removing the basket. The basket must then be replaced and the system resealed and started. During vacuuming, the strainer basket is removed from the skimmer device, and the second end of the hose is inserted into the skimmer device. The collected material goes directly to the filter assembly, with the small strainer basket in the line to remove any large debris. While this system works sufficiently well for its intended conventional use, problems occur when a continuous and automatic to vacuum is employed.

An automatic vacuum is generally coupled to the pump through the skimmer device, rendering the skimmer inoperative. With an inoperative skimmer device, debris will not be removed from the surface of the pool and will eventually sink, to be removed by the main drain and the vacuum. This large debris will be collected in the smaller basket of the filter assembly, which will rapidly fill. A filled basket will greatly reduce the efficiency of a recirculating system, and thus must be cleaned frequently. This partially negates the purpose of the automatic system, which is to reduce the labor involved in cleaning a pool.

Trapping devices have been developed for trapping debris prior to entering the skimmer device to prevent clogging of the main filter assembly. These devices adequately accomplish their goal, however, since they are spliced into the vacuum hose, they are often difficult to reach, and difficult to clean. Furthermore, their movement with the hose as it moves about the pool may result in damage to the trapping device. Also, the skimmer is still rendered inoperable when the vacuum is being used.

It would be highly advantageous, therefore, to remedy the foregoing and other deficiencies inherent in the prior art.

Accordingly, it is an object of the present invention to provide improvements in pool cleaning systems.

Another object of the invention is to provide an improved vacuum system.

And another object of the invention is to provide a vacuum system which will not render a skimmer device inoperable.

Still another object of the immediate invention is to provide a vacuum system which can be operated contemporaneously with a skimmer device.

Yet another object of the invention is to provide improved means for removing large debris from a pool.

Yet still another object of the invention is to provide a vacuum system which collects debris and is easily cleaned and maintained.

SUMMARY OF THE INVENTION

Briefly, to achieve the desired objects of the instant invention in accordance with a preferred embodiment thereof, provided is a vacuum system for use in a swimming pool installation including a swimming pool and a recirculating system. The recirculating system includes a skimmer device and a main drain coupled to a pump and a filter assembly for recirculating the water in the swimming pool. The vacuum system includes a vacuum module mounted adjacent the swimming pool, a conduit coupling the vacuum module to the pump, and a hose coupling extending from the vacuum module in liquid communication with the swimming pool, the hose coupling adapted to receive a vacuum hose.

The vacuum module includes a housing having an upper end, a lower end, and a sidewall extending therebetween defining a first chamber. An inlet is formed in the housing in communication with the first chamber, defined by the hose coupling and an outlet is formed in the housing in communication with the first chamber, the outlet coupled to the conduit. A first opening formed in the housing in communication with the first chamber and a cover sealingly closing the first opening.

In a further embodiment, the vacuum module further includes a strainer basket carried within the first chamber and positioned intermediate the inlet and the outlet. An adjustable valve is coupled between the conduit and the pump for selectively coupling the pump to the vacuum system and/or the skimmer device and main drain.

In yet a further embodiment, the vacuum module includes a second chamber extending from the first chamber adjacent the first opening, the second chamber having a second opening, and a plate removably closing the second opening.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENT

Figures 1, 2:
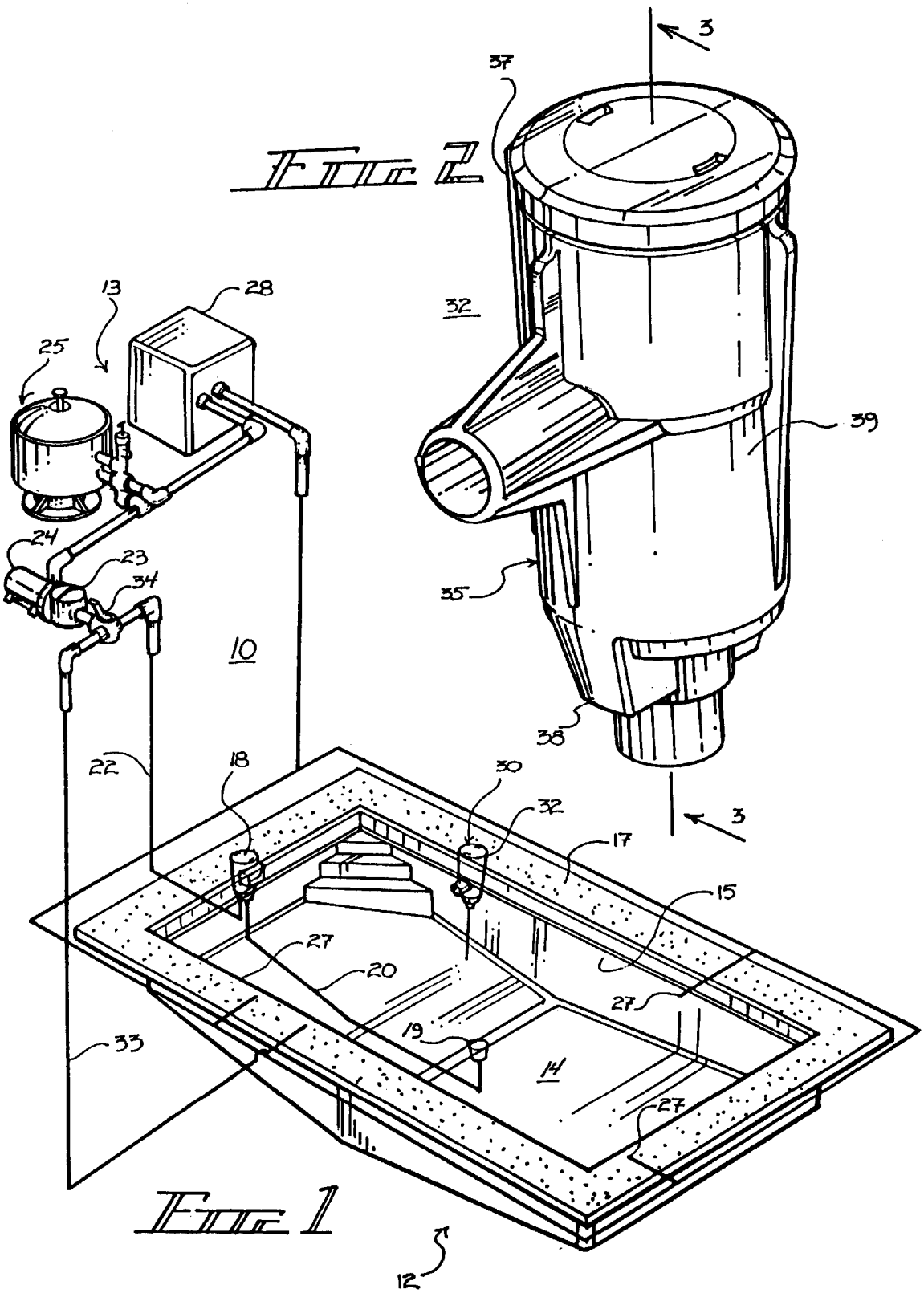
FIG. 1 is a perspective view of a vacuum system, constructed in accordance with the teachings of the present invention, as it would appear in a swimming pool installation.
FIG. 2 is a perspective view of a vacuum module.

Turning now to the drawings in which like reference characters indicate corresponding elements throughout the several views. Attention is first directed to FIG. 1 which illustrates a swimming pool installation 10 including a swimming pool 12 and a recirculating system 13. Swimming pool 12 may be substantially any type known to those skilled in the art, and includes a floor 14, sidewall 15 and a deck 17. Recirculating system 13 includes a skimmer device 18 mounted adjacent sidewall 15 and into deck 17, a main drain 19 mounted in floor 14 and coupled to skimmer device 18 by a conduit 20. A conduit 22 couples skimmer device 18 to a chamber 23, containing a strainer basket (not shown), which is in turn coupled to a pump 24 which draws pool water through main drain 19 and the skimmer device 18, forcing the water through a filter assembly 25 and back into swimming pool 12 through a discharge outlets 27. As will be apparent to one skilled in the art, additional elements may be added to recirculating system 13, such as a water heater 28 coupled between filter assembly 25 and discharge outlets 27.

Set forth for purposes of orientation and reference in connection with the ensuing detailed description of the preferred embodiment of the instant invention, the foregoing brief description of swimming pool installation 10 is intended to be generally representative of typical, swimming pool installations. Details not specifically illustrated and described will be readily understood and appreciated by those skilled in the art.

Still referring to FIG. 1, a vacuum system generally designated 30, constructed in accordance with the teachings of the instant invention, is illustrated coupled to recirculating system 13. Vacuum system 30 includes a vacuum module 32 mounted adjacent sidewall 15 and into deck 17. Vacuum module 32 is coupled to recirculating system 13 by a conduit 33 terminating in a valve 34. Conduit 22 from skimmer device 18 also terminates in valve 34, permitting selection of skimmer/main drain operation alone, vacuum operation alone or both contemporaneously. Valve 34 is coupled to chamber 23 and pump 24. In this manner, swimming pool 12 may be continuously vacuumed while skimmer device 18 and main drain 19 are also operating.

Figure 3:
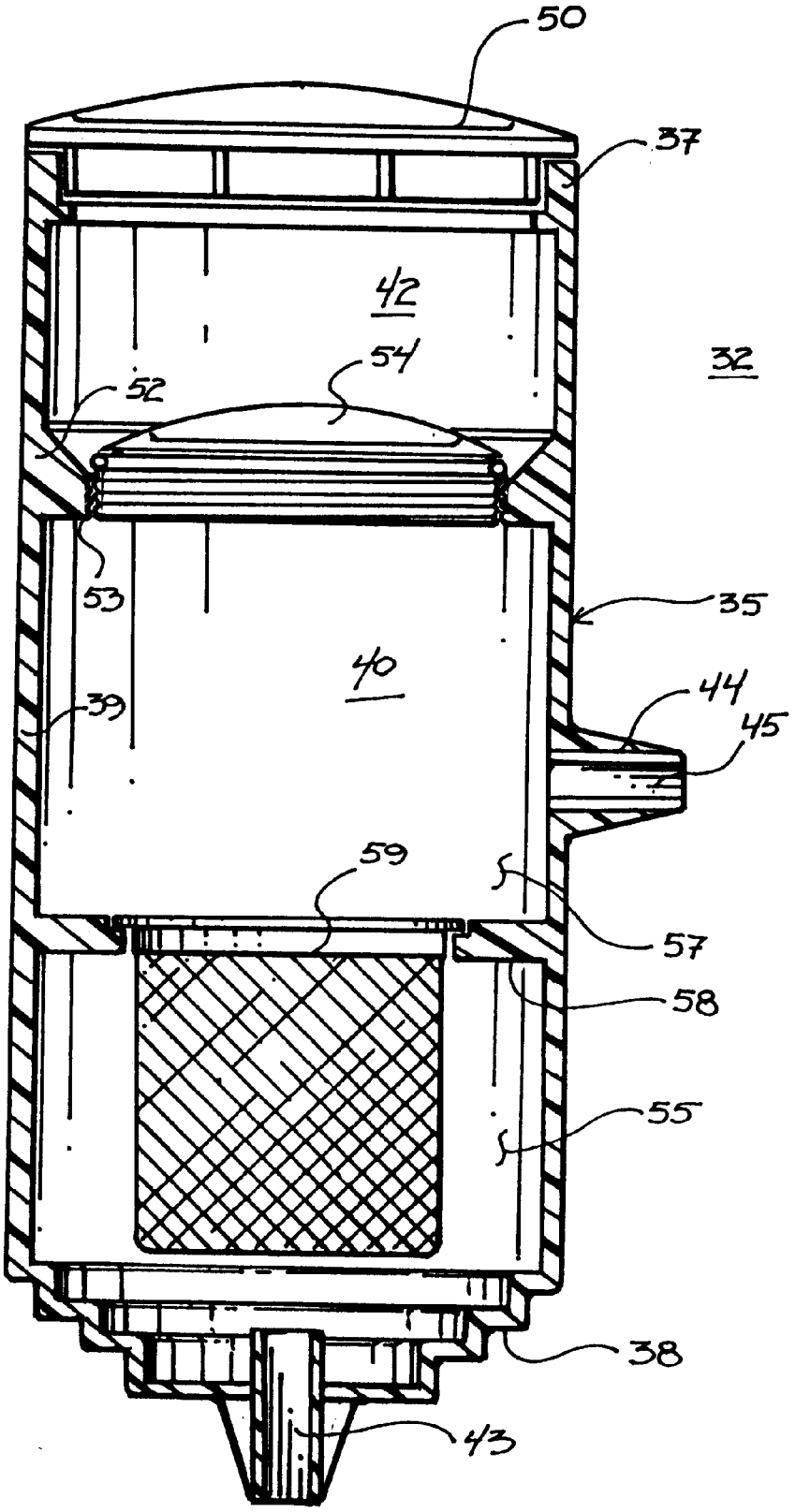
FIG. 3 is a sectional view of the vacuum module taken along line 3—3.

Turning now to FIGS. 2 and 3, vacuum module 32 includes a housing 35 having an upper end 37, a lower end 38 and a sidewall 39 extending therebetween, defining a vacuum chamber 40 and an access chamber 42. An outlet 43 communicating with vacuum chamber 40 is formed in housing 35 at lower end 38 and is adapted to receive conduit 33. A hose coupling 44 defining an inlet 45 in communication with vacuum chamber 40 is formed in sidewall 39 and adapted to receive an end 47 of a vacuum hose 48 (refer to FIG. 5). An access opening 49 is formed at upper end 37. Upper end 37 is closed by a plate 50 which is substantially flush with deck 17. Vacuum chamber 40 is divided from access chamber 42 by an inwardly directed flange 52 having a threaded end 53 for receiving and sealingly engaging a cover 54. In this manner, vacuum chamber 40 can be sealed from access chamber 42. It will be understood by those skilled in the art that other means for coupling cover 54 may be employed such as a friction fit, the use of O-rings or similar seals, etc.

Still referring to FIGS. 2 and 3, vacuum chamber 40 is divided into a lower section 55 and an upper section 57 by an inwardly directed flange 58 adapted to support a strainer basket 59 between inlet 45 and outlet 43. Thus, pool water entering inlet 45 must pass through strainer basket 59 before exiting through outlet 43.

Figures 4, 5:
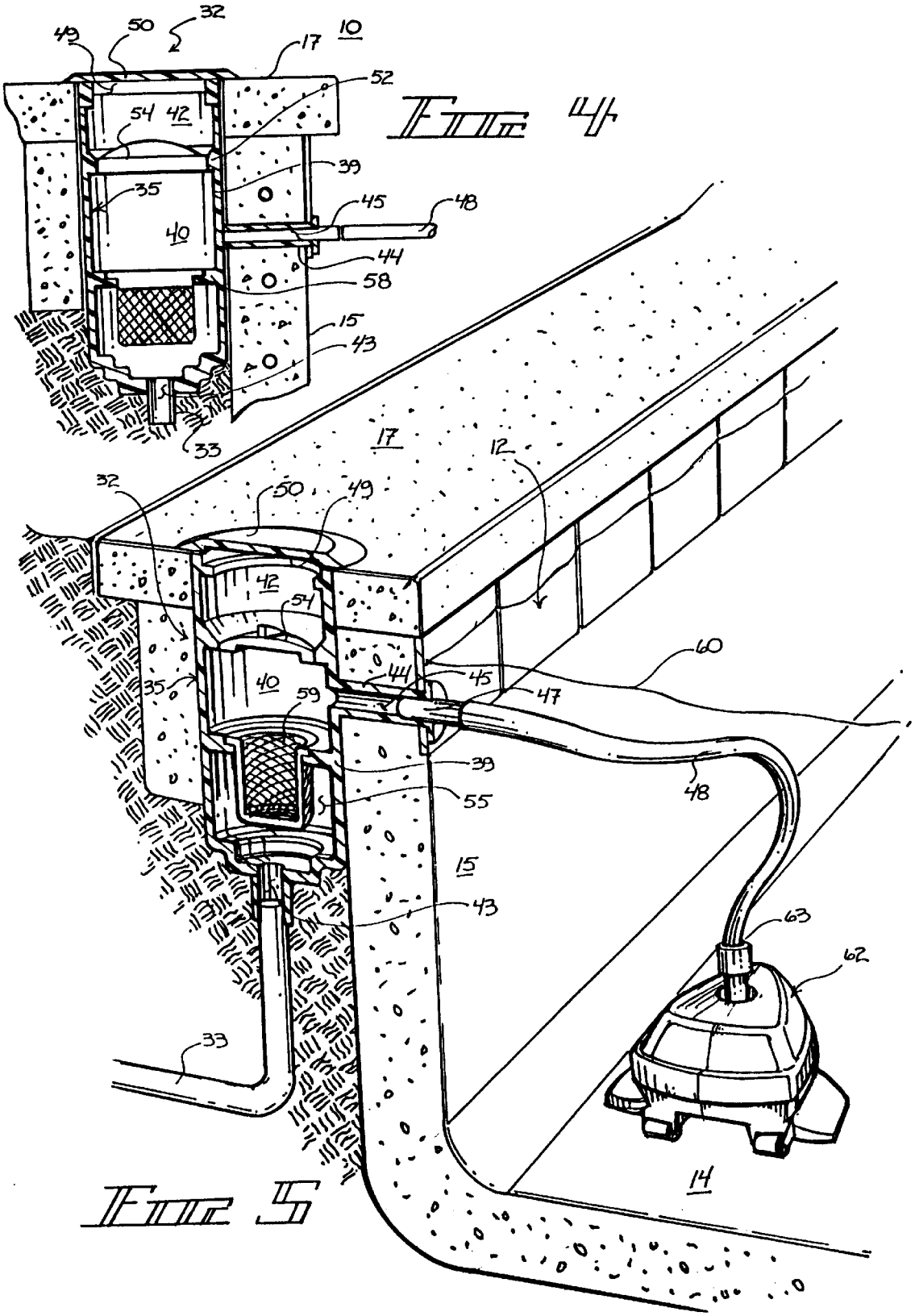
FIG. 4 is a partial sectional view of a swimming pool installation, illustrating the vacuum module adjacent the swimming pool.
FIG. 5 is a perspective view of a swimming pool installation in partial section, illustrating the vacuum system in the pool installation.

Turning now to FIGS. 4 and 5, vacuum module 32 is mounted into deck 17 adjacent sidewall 15 of swimming pool 12. Hose coupling 44 extends from sidewall 39 of housing 35 through sidewall 15 of swimming pool 12, providing liquid communication between swimming pool 12 and vacuum chamber 40. As can be seen with specific reference to FIG. 5, hose coupling 44 is positioned below water level 60 of swimming pool 12. In this embodiment, vacuum module 32 is inset into deck 17 such that vacuum chamber 40 is below water level 60. Thus pool water will readily flow into and fill vacuum chamber 40 through inlet 45. Furthermore, recessing vacuum module 32 below deck 17 will remove it as an obstruction from the pool side, and will also remove it from sight while retaining case of access. In this arrangement, access chamber 42 is necessary to raise access opening 49 level with deck 17. Plate 50 can easily be removed allowing removal of cover 54 to access and empty strainer basket 59.

Other configurations have been contemplated, such as raising the level of vacuum chamber 40. While this is possible, raising the level will prevent filling with pool water, resulting in a quantity of air being drawn by pump 24. Should recirculating system 13 run dry, damage to pump 24 may occur. Additionally, repriming of the entire system may become necessary. Therefore, while vacuum chamber 40 may be above water level 60 as long as pool water enters inlet 45, it is preferred that it be located below water level 60. Thus, vacuum chamber 40 need not be completely below water level, as long as inlet 45 remains below water level 60 or is coupled to a source below water level 60.

Still referring to FIG. 5, a vacuum device 62 can be coupled to vacuum module 32 by vacuum hose 48. End 47 of vacuum hose 48 is received by hose coupling 44, and an opposing end 63 is received by vacuum device 62. As pump 24 draws water through outlet 43, suction is created within vacuum chamber 40 which is communicated along vacuum hose 48 to vacuum device 62. This suction picks up debris with the pool water and generally provides motive force for vacuum device 62. Water and debris pulled through vacuum hose 48 enters vacuum chamber 40 through inlet 45 and exits through outlet 43 after passing through strainer basket 59. Strainer basket 59 collects the larger debris while the smaller particles pass through conduit 33 to filter assembly 25.

After a period of time, depending on the amount of debris in swimming pool 12, strainer basket 59 must be emptied. This is a simple process consisting of adjusting valve 34 to skimmer/main drain operation alone, removing plate 50 and cover 54, extracting, emptying and replacing strainer basket 59 and replacing cover 54 and plate 50. Valve 34 can then be adjusted to vacuum operation again. During the process of vacuuming and emptying strainer basket 59, both skimmer device 18 and main drain 19 can remain in operation. The frequency with which strainer basket 59 needs to be emptied is reduced by the continued operation of main drain 19 and skimmer device 18.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A vacuum system for use in a swimming pool installation including a swimming pool and a recirculating system, the recirculating system having a skimmer device and a main drain coupled to a pump and a filter assembly for recirculating the water in the swimming pool, said vacuum system comprising:

a vacuum module mounted adjacent the swimming pool independent of the skimmer device;

a conduit coupling the vacuum module to the pump;

a single fluid inlet defined by a hose coupling extending from the vacuum module in direct liquid communication with the swimming pool, the hose coupling adapted to receive a vacuum hose; and the vacuum module including a housing having an upper end, a lower end, and a sidewall extending therebetween defining a first chamber, the single fluid inlet formed in the housing in communication with the first chamber, defined by the hose coupling;

an outlet formed in the housing in communication with the first chamber, the outlet coupled to the conduit;

a first opening formed in the housing in communication with the first chamber, and a cover sealingly closing the first opening wherein the skimmer device and vacuum module arc constructed and arranged such that the swimming pool may be continuously vacuumed while the skimmer device and main drain are also operating.

2. A system as claimed in claim 1 wherein the vacuum module further includes a strainer basket carried within the first chamber and positioned intermediate the inlet and the outlet.

3. A system as claimed in claim 2 further including a vacuum hose having a first end received by the hose coupling and a second end coupled to a vacuum device.

4. A system as claimed in claim 2 further including an adjustable valve coupled between the conduit and the pump for selectively coupling the pump to the vacuum system and/or the skimmer device and main drain.

5. A system as claimed in claim 4 further including a second chamber extending from the first chamber adjacent the first opening, the second chamber having a second opening, and a plate removably closing the second opening.

6. A vacuum module independently installable adjacent a swimming pool of a swimming pool installation, the swimming pool installation further including a recirculating system having a skimmer assembly and a main drain coupled to a pump and a filter assembly for recirculating the water in the swimming pool, said vacuum module comprising:

a housing having an upper end, a lower end, a sidewall extending therebetween, and a flange extending from the sidewall intermediate the upper end and the lower end defining an upper chamber and a lower chamber;

an outlet formed in the lower end of the housing in communication with the lower chamber and adapted to be coupled to the pump;

a single inlet independent of the main drain and the skimmer assembly formed in the sidewall of the housing in communication with the lower chamber and adapted to communicate directly with the pool and to receive an end of a vacuum hose;

a first opening formed in the upper end of the housing;

a plate removably closing the first opening;

a second opening defined by the flange, the second opening providing communication between the upper chamber and the lower chamber; and a cover for sealingly closing the second opening wherein the skimmer device and vacuum module are constructed and arranged such that the swimming pool may be continuously vacuumed while the skimmer device and main drain are also operating.

7. A vacuum module as claimed in claim 6 wherein the vacuum module further includes a filter basket carried within the lower chamber and separating the inlet from the outlet.

8. A vacuum module as claimed in claim 7 wherein the inlet is positioned above the outlet such that incoming water flows down to the outlet, passing through the filter basket.

9. A swimming pool installation comprising:

a swimming pool having a bottom and side walls extending upright from the bottom;

a recirculating system coupled to the swimming pool for recirculating pool water, the recirculating system including a pump coupled to a filter system, a main drain mounted in the floor of the swimming pool and coupled to the pump, and a skimmer device positioned adjacent the sidewall and coupled to the pump;

a vacuum system independent of the main drain and skimmer device, coupled to the pump, the vacuum system including a vacuum module positioned adjacent the sidewall of the swimming pool, a conduit coupling the vacuum module to the recirculating system, and a hose coupling extending from the vacuum module in direct liquid communication with the swimming pool, the hose coupling adapted to receive a vacuum hose, the vacuum module including:

a housing having an upper end, a lower end, and a sidewall extending therebetween defining a first chamber;

an inlet formed in the housing in communication with the first chamber, defined by the hose coupling;

an outlet formed in the housing in communication with the first chamber, the outlet coupled to the conduit;

a first opening formed in the housing in communication with the first chamber; and a cover sealingly closing the first opening wherein the skimmer device and vacuum module are constructed and arranged such that the swimming pool may be continuously vacuumed while the skimmer device and main drain are also operating.

10. A swimming pool installation as claimed in claim 9 wherein the vacuum module further includes a strainer basket carried within the first chamber and positioned intermediate the inlet and the outlet.

11. A swimming pool installation as claimed in claim 10 further including a vacuum hose having a first end received by the hose coupling and a second end coupled to a vacuum device.

12. A swimming pool installation as claimed in claim 10 further including an adjustable valve coupled between the conduit and the pump for selectively coupling the pump to the vacuum system and/or the skimmer device and main drain.

13. A swimming pool installation as claimed in claim 12 further including a second chamber extending from the first chamber adjacent the first opening, the second chamber having a second opening and, and a plate removably closing the second opening.

*14. A vacuum system for use in a swimming pool installation including a swimming pool and a recirculating system, the recirculating system having a skimmer device and a main drain coupled to a pump and a filter assembly for recirculating the water in the swimming pool, the vacuum system comprising:*

*a vacuum module including a housing bounding a vacuum chamber coupled in liquid communication with the pump and in liquid communication with the swimming pool independent of the skimmer device and the main drain;*

*wherein the skimmer device and the vacuum module are constructed and arranged such that the swimming pool may be continuously vacuumed while the skimmer device and the main drain are also operating.*

*15. The system of claim 14, further including a strainer basket carried by the vacuum chamber.*

*16. The system of claim 14, further including a conduit coupling the vacuum chamber with the pump in liquid communication.*

*17. The system of claim 16, further including an adjustable valve coupled intermediate the conduit and the pump for selectively coupling the pump to one or more of the vacuum system, the skimmer device and the main drain.*

*18. A vacuum module for installation adjacent a swimming pool of a swimming pool installation comprising a recirculating system including a skimmer assembly, a main drain coupled to a pump and a filter assembly for recirculating the water in the swimming pool, the vacuum module comprising:*

*a vacuum module including a housing bounding a vacuum chamber, an outlet in communication with the vacuum chamber and engagable with the pump in liquid communication, and a single inlet independent of the main drain and the skimmer assembly in liquid communication with the vacuum chamber and engagable in liquid communication with the swimming pool and with a vacuum hose;*

*wherein the skimmer device and the vacuum module are constructed and arranged such that the swimming pool may be continuously vacuumed while the skimmer device and the main drain are also operating.*

*19. The vacuum module of claim 18, further including a filter basket carried by the vacuum chamber intermediate the single inlet and the outlet.*

*20. The vacuum module of claim 19, wherein the single inlet is positioned above the outlet such that incoming water flows down to the outlet, passing through the filter basket.*

*21. A swimming pool installation, comprising:*

*a swimming pool having a bottom and side walls extending upright from the bottom;*

*a recirculating system coupled to the swimming pool for recirculating pool water, the recirculating system including a pump coupled to a filter system, a main drain mounted in the floor of the swimming pool and coupled to the pump, and a skimmer device positioned adjacent the sidewall and coupled to the pump;*

*a vacuum system coupled with the pump, the recirculating system and in liquid communication with the swimming pool independent of the main drain and skimmer device, the vacuum system comprising:*

*a vacuum module including a housing bounding a vacuum chamber coupled in liquid communication with the pump and in liquid communication with the swimming pool independent of the skimmer device and the main drain;*

*wherein the skimmer device and the vacuum module are constructed and arranged such that the swimming pool may be continuously vacuumed while the skimmer device and the main drain are also operating.*

*22. The swimming pool installation of claim 21, further including a strainer basket carried by the vacuum chamber.*

*23. The swimming pool installation of claim 21, further including:*

*a single inlet coupling the vacuum chamber in liquid communication with the pump; and*

*a vacuum hose having a first end coupled in liquid communication with the single inlet and a second end coupled in liquid communication with a vacuum device.*

*24. The swimming pool installation of claim 21, further including a conduit coupling the vacuum chamber in liquid communication with the pump.*

*25. The swimming pool installation of claim 24, further including an adjustable valve coupled intermediate the conduit and the pump for selectively coupling the pump to one or more of the vacuum system, the skimmer device and the main drain.*

* * * * *